United States Patent
Rothman et al.

(10) Patent No.: US 7,826,835 B2
(45) Date of Patent: Nov. 2, 2010

(54) MOBILE PHONE POLICY MANAGEMENT

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 11/014,605

(22) Filed: Dec. 16, 2004

(65) Prior Publication Data

US 2006/0135140 A1    Jun. 22, 2006

(51) Int. Cl.
*H04M 3/00* (2006.01)
(52) U.S. Cl. .................. 455/420; 455/419; 455/466; 455/456.4; 455/414.1; 455/556.2; 348/211.2
(58) Field of Classification Search ......... 455/410–411, 455/466, 456.3, 420, 41.2, 556.1–556.2, 455/575.3; 348/211.13, 211.8, 14.01
See application file for complete search history.

(56) References Cited

U.S. PATENT DOCUMENTS

| | | | | |
|---|---|---|---|---|
| 5,235,633 | A * | 8/1993 | Dennison et al. | 455/456.3 |
| 6,011,973 | A * | 1/2000 | Valentine et al. | 455/456.6 |
| 6,212,635 | B1 * | 4/2001 | Reardon | 713/165 |
| 6,738,572 | B2 * | 5/2004 | Hunter | 396/56 |
| 6,832,101 | B1 * | 12/2004 | Kino | 455/550.1 |
| 6,907,254 | B1 * | 6/2005 | Westfield | 455/456.4 |
| 7,013,128 | B2 * | 3/2006 | Ozeki et al. | 455/411 |
| 7,139,014 | B1 * | 11/2006 | Kim et al. | 348/14.01 |
| 7,184,785 | B2 * | 2/2007 | Balley et al. | 455/466 |
| 7,194,273 | B2 * | 3/2007 | Vaudreuil | 455/456.3 |
| 7,286,834 | B2 * | 10/2007 | Walter | 455/456.1 |
| 7,317,475 | B2 * | 1/2008 | Arai et al. | 348/207.99 |
| 7,321,761 | B2 * | 1/2008 | Sharma | 455/411 |
| 7,656,294 | B2 * | 2/2010 | Boss et al. | 340/540 |
| 7,725,098 | B1 * | 5/2010 | Claudatos et al. | 455/411 |
| 2001/0031631 | A1 | 10/2001 | Pitts | |
| 2002/0055361 | A1 * | 5/2002 | McDonnell et al. | 455/456 |
| 2003/0008662 | A1 * | 1/2003 | Stern et al. | 455/456 |
| 2004/0067750 | A1 * | 4/2004 | Engstrom et al. | 455/411 |
| 2004/0185925 | A1 * | 9/2004 | Kim | 455/575.3 |
| 2005/0007456 | A1 * | 1/2005 | Lee et al. | 348/207.99 |
| 2005/0064856 | A1 * | 3/2005 | Atkin et al. | 455/418 |
| 2005/0090267 | A1 * | 4/2005 | Kotzin | 455/456.4 |

(Continued)

FOREIGN PATENT DOCUMENTS

EP    1164808    12/2001

(Continued)

OTHER PUBLICATIONS

International Search Report and Written Opinion for Int'l Patent Application No. PCT/US2005/046001 mailed Apr. 25, 2006, 23 pgs.

(Continued)

*Primary Examiner*—Sharad Rampuria
(74) *Attorney, Agent, or Firm*—Blakely, Sokoloff, Taylor & Zafman LLP

(57) ABSTRACT

The present disclosure relates to attempting to control and monitor a number of features associated with a mobile telephone and, more specifically, to attempting to turn a specific feature, such as, for example, the ability to take pictures, on or off based upon a set policy scheme.

22 Claims, 4 Drawing Sheets

U.S. PATENT DOCUMENTS

| | | | |
|---|---|---|---|
| 2005/0134696 A1* | 6/2005 | Nath et al. | 348/211.9 |
| 2005/0186946 A1* | 8/2005 | Takahashi | 455/413 |
| 2005/0239481 A1* | 10/2005 | Seligmann | 455/456.2 |
| 2005/0266857 A1* | 12/2005 | Poikela | 455/456.3 |
| 2006/0099965 A1* | 5/2006 | Aaron | 455/456.3 |
| 2008/0009313 A1* | 1/2008 | Ishii | 455/556.1 |
| 2008/0062258 A1* | 3/2008 | Bentkovski et al. | 348/50 |

FOREIGN PATENT DOCUMENTS

| | | |
|---|---|---|
| JP | 2002-027554 | 1/2002 |
| JP | 2003-199162 | 7/2003 |

OTHER PUBLICATIONS

International Preliminary Report for Int'l Patent Application No. PCT/US2005/046001 mailed Jun. 28, 2007, 15 pgs.

Translation of First Office Action for Chinese Patent Application No. 200480007742.1 mailed Nov. 30, 2007, 3 pgs.

Weiss, K., et al., "Conventional Local Area Radio Coverage System," Motorola Technical Developments, Motorola Inc., vol. 13, Jul. 1, 1991, pp. 67-69, XP000259225.

Translation of Office Action for Korean Patent Application No. 10-2007-7014545 mailed Nov. 24, 2008, 3 pgs.

Translation of First Office Action for Japanese Patent Application No. 2007-547011 mailed May 26, 2009, 20 pgs.

Translation of Office Action for Korean Patent Application No. 10-2007-7014545 mailed Aug. 10, 2009, 12 pgs.

Translation of Third Office Action for Chinese Patent Application No. 200480007742.1 mailed Dec. 11, 2009, 6pgs.

Translation of Office Action for Korean Patent Application No. 10-2007-7014545 mailed Mar. 31, 2010, 20 pgs.

Translation of First Office Action for Japanese Patent Application No. 2007-547011 mailed Apr. 6, 2010, 13 pgs.

* cited by examiner

MOBILE PHONE POLICY MANAGEMENT

BACKGROUND

1. Field

The present disclosure relates to attempting to control and monitor a number of features associated with a mobile telephone and, more specifically, to attempting to turn a specific feature, such as, for example, the ability to take pictures, on or off based upon a set policy scheme.

2. Background Information

In this context a mobile phone is typically a hand-held mobile wireless (frequently radio-based) telephone often for use in an area divided into small sections (cells), each generally with its own short-range transmitter/receiver. A mobile phone may also be referred to as a cell phone, a car phone, a transportable phone, or a personal phone. It is contemplated that in some embodiments the mobile phone may use analog, digital (e.g. Personal Communications Service, PCS), or Third Generation (3G) technology.

Mobile phones have become extremely popular and are often carried wherever the owner goes. In addition, the mobile phones have continued to add features in addition to the ability to communicate via the telephone network. In some embodiments, the features may include, but are not limited to, text messaging (e.g. Short Message Service, SMS), indicating that a message has arrived by playing a ring tone or vibrating, video conferencing, acting as a camera or video recorder, the ability to play music (e.g. MP3 files), or acting as a computer or personal digital assistant.

These features while useful and desirable in some locations and many times, may be undesirable at other locations and times. For example, while the ability to play a ringtone may normally be convenient, a noise may be undesirable in a movie theater. Most people are aware of the annoyance and having a movie interrupted because another patron was too forgetful or rude to turn off their mobile phone.

In another instance, some features may not be acceptable due to security concerns. For example, a company may not allow cameras to be brought on site due to fears of having product information leaked to the public or competitors. In the past this policy was fairly easy to enforce as the only devices capable of recording images were generally cameras or video recorders. Each of which were simple to detect due to the size needed to house the analog film. Now a camera may be housed within a mobile phone that is small enough to fit in someone's palm. This camera enabled mobile phone may be very difficult to detect. A need therefore exists, to detect and manage features available as part of mobile phones.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

In a specific illustrative embodiment of the disclosed subject matter, a company may wish to restrict or forbid the use of cameras at the company's site. In order to facilitate this policy, a cell transceiver located at the company's site may be configured to broadcast a request to disable the camera feature on any policy management compliant mobile phones. In one embodiment, any detected non-compliant mobile phones may trigger an alert.

As an employee enters the site, their mobile phone may transition from a non-restricted cell transmitter to the company's restricted cell transmitter. The company's cell transmitter may determine whether or not the mobile phone is capable of taking pictures and, if so, request that the mobile phone disable that feature. In one embodiment, the company may allow a select group of people to take pictures on the site. In this embodiment, the cell transmitter may also determine if the mobile phone belongs to one of these individuals and, if so, allow the camera feature to remain active. When the employee leaves the site, the camera feature may be re-enabled. Of course, this is merely one illustrative embodiment of the technique and other examples are contemplated.

Figure 1:
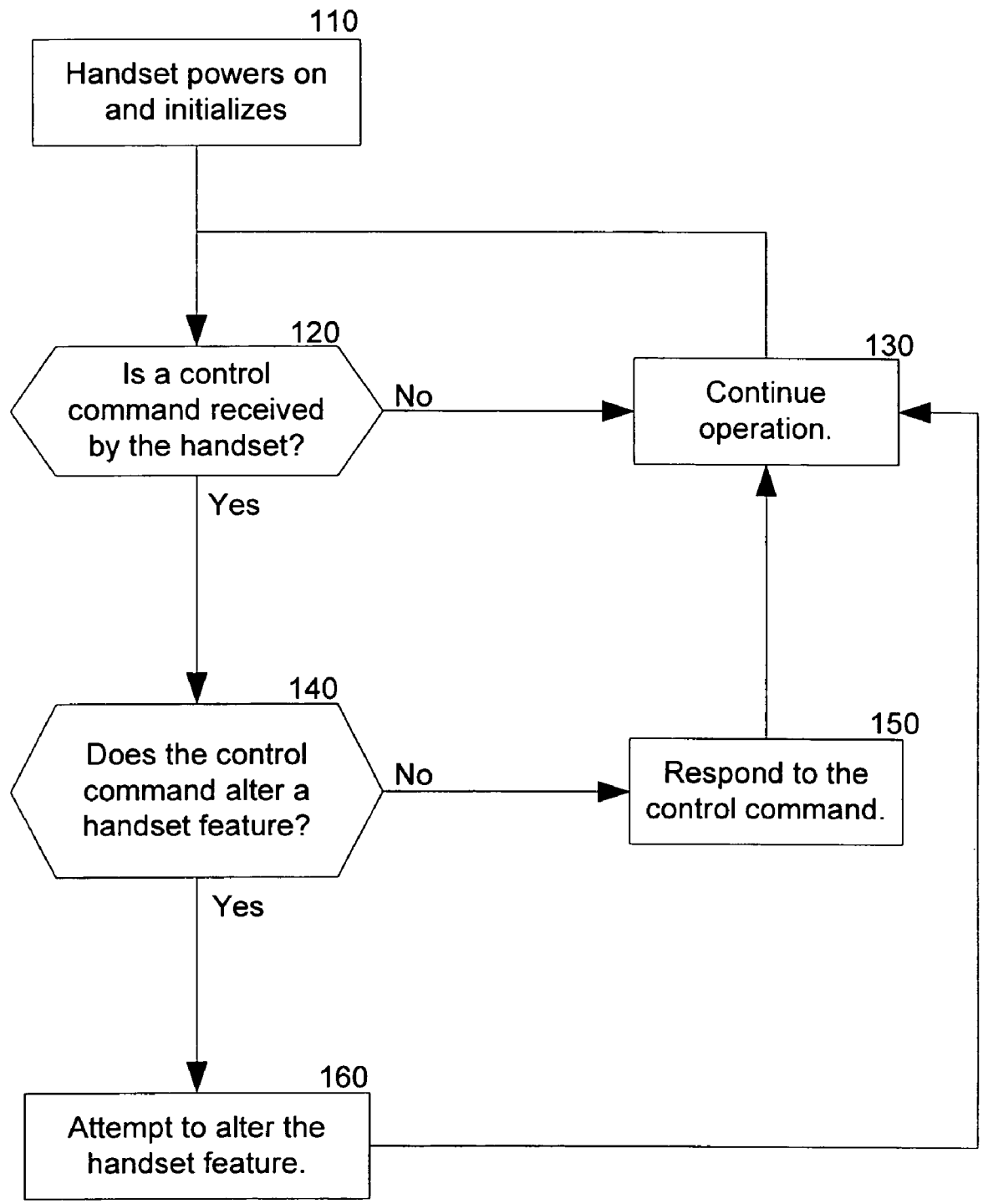
FIG. 1 is a flow chart illustrating an embodiment of a mobile phone policy management technique in accordance with the claimed subject matter.

FIG. 1 is a flow chart illustrating an embodiment of a mobile phone policy management technique in accordance with the claimed subject matter. Block 110 illustrates that, in one embodiment, the handset, or mobile may power on and initialize. In one embodiment, this initialization may involve known techniques for mobile phone initialization. In another embodiment, the mobile phone may enumerate the features the phone supports and the status of the features. Also, in one embodiment, the initialization may occur substantially independently of powering on the device. In another embodiment, powering on the device may include removing the device from a reduced power state, such as, for example, sleep mode, standby, or inactive.

Block 120 illustrates that the mobile phone may wait to receive a control command. In one embodiment, the control command may occur when a mobile phone transitions from one cell transceiver to another. It is contemplated that the control command may allow locality based control of specific mobile phone features. If no control command is received, Block 130 illustrates that the mobile phone continue to operate normally.

Block 140 illustrates that, in one embodiment, the mobile phone may determine if the control command requests that a feature be altered. If not, Block 150 illustrates that the mobile phone may respond to the control command in a typically fashion. In one embodiment, an initial control command may request an enumeration of the features supported by the mobile phone. In such an embodiment, it is contemplated that the mobile phone may respond with a list of the capabilities.

In one embodiment, the mobile phone may use a technique substantially complaint with the General Packet Radio Service (GPRS) protocol. In other embodiments, the control command may query for specific information, such as for example, feature, capability, or data.

It is further contemplated that, in one embodiment, the control command may request information from the mobile phone. For example, upon entering a building a control command may be sent requesting the ownership of the mobile phone. If the owner of the phone is one an authorized list certain features may be enabled or allowed. In this embodiment, the control command may request the information stored as part of the Subscriber Information Module (SIM) associated with the mobile phone. It is contemplated that other information may be requested from the mobile phone. In one embodiment, the information may be automatically relayed. In another embodiment, the information may require an action be taken by the user of the mobile phone.

Block 160 illustrates that, if the control commend alters a feature, an attempt be made to alter the requested feature. In one embodiment, a signal may be generated to temporarily disable a feature. It is contemplated that, in one embodiment, the feature may be altered in a variety or ways, such as, for example, disabling the feature, enabling the feature, limiting the quality of the feature (e.g. quality of recording, volume level, etc.), or altering the behaviour of the feature (e.g. who the mobile phone may contact, changing the user interface, switching to vibrate mode, disabling incoming calls, etc.); however, these are merely a few non-limiting examples to which the disclosed matter is not bound. In another embodiment, multiple features may be altered either due to the control command, or as part of a set of rules within the mobile phone.

In one embodiment, the mobile phone may respond with an acknowledgment of success or failure in altering the feature. It is contemplated that in one embodiment, a false acknowledgement, essentially lying to the cell transceiver, be sent. It is also contemplated that in one embodiment the alteration of the feature may occur substantially automatically. In another embodiment, the alteration of the feature may occur after some user interaction has occurred, such as, for example, approval of the conditions of access to the cell transmitter.

Figure 2:
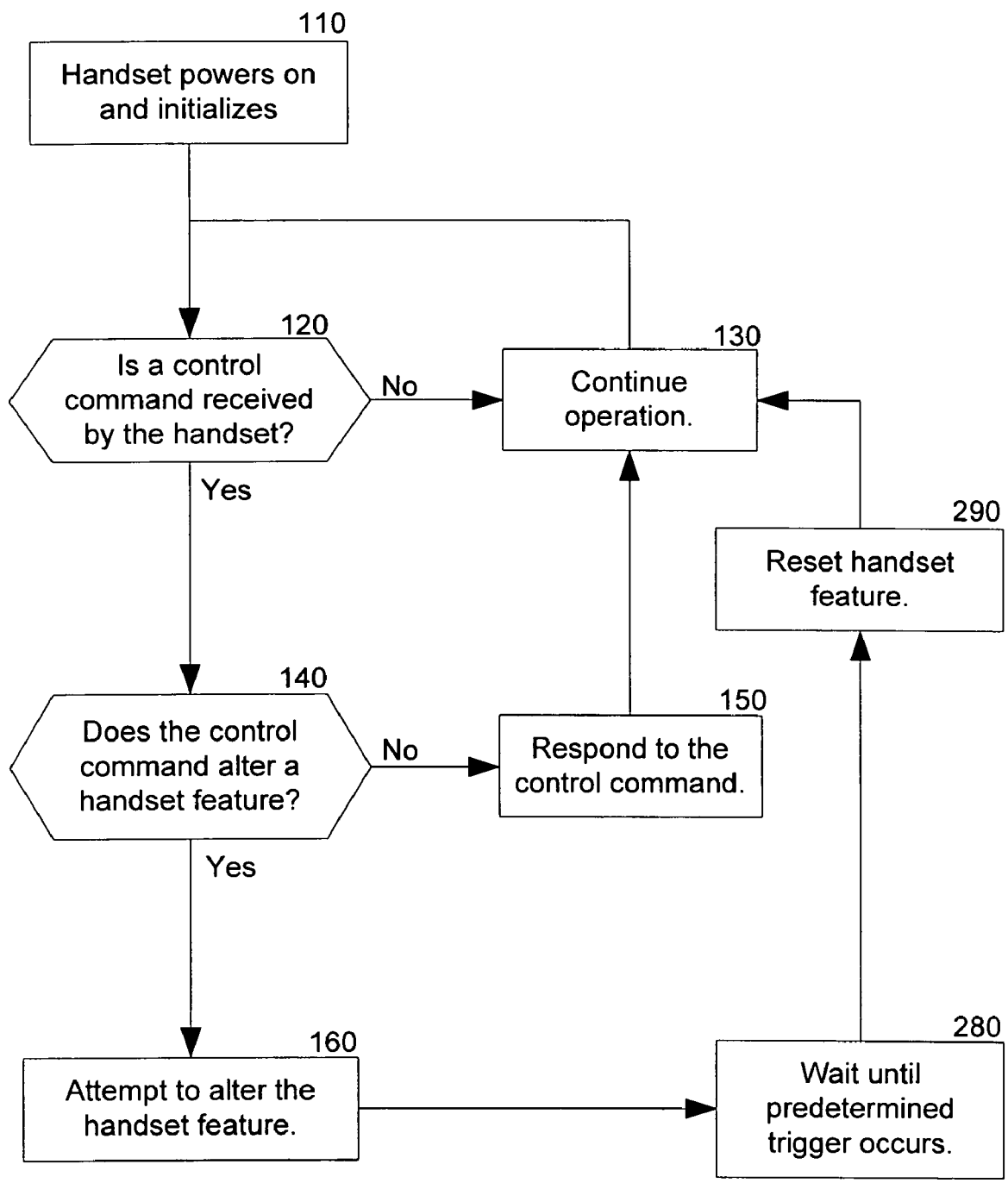
FIG. 2 is a flow chart illustrating an embodiment of a mobile phone policy management technique in accordance with the claimed subject matter.

FIG. 2 is a flow chart illustrating an embodiment of a mobile phone policy management technique in accordance with the claimed subject matter. In one embodiment, Blocks 110, 120, 130, 140, 150, & 160 may occur essentially as described above. However, other embodiments are within the scope of the disclosed subject matter.

Block 280 illustrates that, in one embodiment, the mobile phone may wait until a predetermined trigger occurs. In one embodiment, this predetermined trigger may include events such as, for example, transferring to a new cell transceiver, user interaction, or a certain amount of time, possibly set by the user, mobile phone manufacturer, mobile phone service provider, or as part of the control command sequence; however, these are merely a few non-limiting examples of events that may trigger action by the mobile phone. It is also contemplated that, in one embodiment, normal phone operation and access to other features may occur while the phone waits for the trigger to occur.

Block 290 illustrates that after the trigger has been received, the feature may be reset back to "normal" operation. In one embodiment, the "normal" operation may involve resetting the feature back to a predefined state set by the user, phone manufacturer, or service provider. In another embodiment, the feature may be returned to the previous state, prior to the last altering control command.

Figure 3:
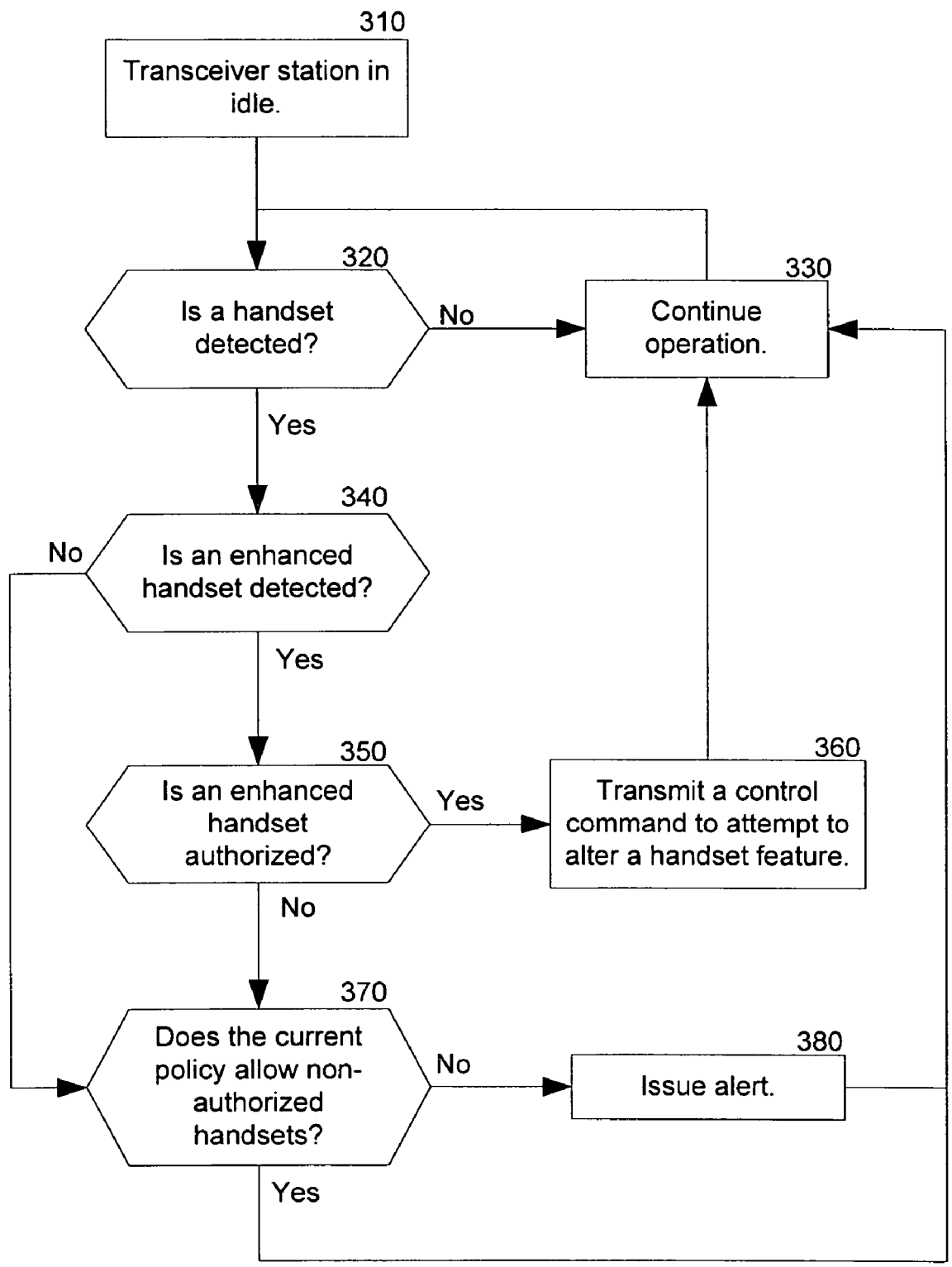
FIG. 3 is a flow chart illustrating an embodiment of a mobile phone policy management technique in accordance with the claimed subject matter.

FIG. 3 is a flow chart illustrating an embodiment of a mobile phone policy management technique in accordance with the claimed subject matter. Block 310 illustrates that a cell transceiver may remain in a substantially idle state. In one embodiment, the cell transceiver may interact and communicate with a number of mobile phones and other devices in a substantially simultaneous manner. It is contemplated that while interacting and communicating with a first mobile phone, the cell transceiver may appear idle relative to a second mobile phone.

Block 320 illustrates that the cell transceiver may wait until a mobile phone, or handset, is detected. In one embodiment, the detection may occur as a result of the mobile phone transitioning from a previous cell transceiver of the current cell transceiver. In another embodiment, the detection may come as a result of the mobile phone being powered on or coming out of an inactive state. However, the reason the mobile phone is detected is immaterial to the current technique. If a mobile phone is not detected, Block 330 illustrates that the cell transceiver may continue to operate, as described above.

Block 340 illustrates that a determination may be made whether or not the mobile phone is an enhanced mobile phone. In this context, an enhanced mobile phone includes a mobile phone that contains features in addition to the ability of communicate via the telephone network. In one embodiment, an enhanced mobile phone may include the ability to communicate that fact to another device. In another embodiment, the enhanced mobile phone may not communicate the existence of the feature(s) directly but may allow a means by which the features or their existence may be detected or inferred. In yet another embodiment, an enhanced mobile phone may include a policy management capable mobile phone, which allows the modification of alteration of certain features.

In one embodiment, this determination may be made, at least in part, by utilizing a control command sent to the mobile phone. In one embodiment, a control command may be sent to the requesting a listing of all the features supported by the phone, as described above in relation to FIG. 1. In another embodiment, other data may be requested, such as, for example, the model number of the mobile phone, and a determination made utilizing that data. It is contemplated that other techniques may be used to determine if the mobile phone is enhanced.

Block 350 illustrates that, if an enhanced mobile phone is detected, determining whether or not an enhanced mobile phone is authorized within the control area of the cell transceiver. In one embodiment, the determination may involve allowing a first set of enhanced mobile phone with an authorized set of features but not allowing a second set of enhanced mobile phones with a second set of features. For example, features such as SMS may be allowed but the ability to record images (e.g. cameras) may not be allowed. In one variation of the embodiment, the ability to record images may be allowed if the feature may be disabled. In another embodiment, only policy management capable mobile phones may be allowed.

It is contemplated that, in one embodiment, the policy system allowing or disallowing certain features may be derived from a substantially predetermined policy rule set or list. In another embodiment, the policy system may be dynamically or automatically generated. In one embodiment, the policy system may reside within the cell transceiver or, in another embodiment, the cell transceiver may query a separate device or system for the policy system.

In one embodiment, the determination of whether or not an enhanced mobile phone is authorized to operate within a cell transceiver area may include requesting additional information form the mobile phone or a separate system or device. In one embodiment, the level of authorization may depend upon the known or inferred user of the mobile phone. For example, in one specific embodiment, the identity of the mobile phone user may be inferred by requesting the information contained within the mobile phone's Subscriber Identity Module (SIM). In another embodiment, the number assigned to the mobile phone may be cross-referenced with another database, such as, for example, a reverse phone book, in order to infer the user of the phone and the authorization level allowed to the mobile phone features. In yet another embodiment, the user may manually or automatically identify themselves via another technique, such as, for example, a biometric employment badge, identify themselves to a guard, etc. In one embodiment, the level of authorization may be determined via a password (or equivalent data) included in the mobile phone or entered by other means.

Block 360 illustrates that, if the mobile phone is authorized, an attempt may be made to alter a number of features available to the mobile phone. In one embodiment, no features may be altered. In another embodiment, some features may be activated, disabled, or modified as described above in reference to FIG. 1. In one embodiment, the feature may be altered utilizing a control command. In one embodiment, the control command may be transmitted via a control channel. In one embodiment, the cell transceiver may return to a more typical operation, Block 330. However, other embodiments may exist in which the cell transceiver may monitor the success of the alteration and issue an alert if the alteration was unsuccessful or later the feature becomes altered in a way that is not authorized, such as, for example, the user reactivates a feature that was disabled.

Block 370 illustrates that, if the mobile phone is neither enhanced nor authorized, a determination may be made as to whether or not the policy control system allows non-authorized mobile phones. In one embodiment, the enhanced mobile phone may be allowed if one or more feature may be altered or properly controlled.

Block 380 illustrates that, if not, an alert may be issued. In one embodiment, the alert may restrict a user to a part of the cell transceiver area that allows non-authorized mobile phones. For example, the area covered by the cell transceiver may include a building and the sidewalk surrounding the building. If a person is carrying a non-authorized mobile phone, the policy system may refuse to allow the person to enter the building, via, for example, a guard or physically locking the doors to the building; thereby restricting the user to just the sidewalk area covered by the cell transceiver.

In another embodiment, the cell transceiver may simply refuse to communicate with the mobile phone and not allow the mobile phone access to the telephone network via the cell transceiver. For example, in one specific embodiment, a policy may be created to only allow mobile phone users access to the cell transceiver if they agree to a Terms Of Use contract. If the users do not, the cell transceiver may refuse to allow the mobile phone to communicate with the telephone network within the area covered by the cell transceiver. One specific embodiment of a Terms Of Use contract may include a movie theatre or restaurant that requires patrons to refrain from using their mobile phones within the premises, or requires that mobile phones not use ringtones. It is contemplated that embodiments may exist where the same effect may be achieved without the use of a Terms Of Use contract. These are merely a few specific illustrative embodiments, and the disclosed subject matter is not limited to any one embodiment.

In one embodiment, an alert may be issued that includes information received during the action of Block 350. For example, in a specific embodiment, a school may set a policy that text messaging is not allowed, due to students text messaging the test answers to each other. Student Suzy may have a non-authorized mobile phone. This may be detected when she enters the area of the cell transceiver that covers the campus of her school. During the action of Block 350 or 340 it may be determined that a non-authorized mobile phone likely belongs to Suzy and that, as a student, Suzy is not authorized to have a mobile phone that violates school policy. An example of an alert may be an email to her teachers that Suzy has a mobile phone that either includes text messaging or has unknown capabilities. However, this is merely a specific illustrative embodiment, and the disclosed subject matter is not limited to any one embodiment.

Figure 4:
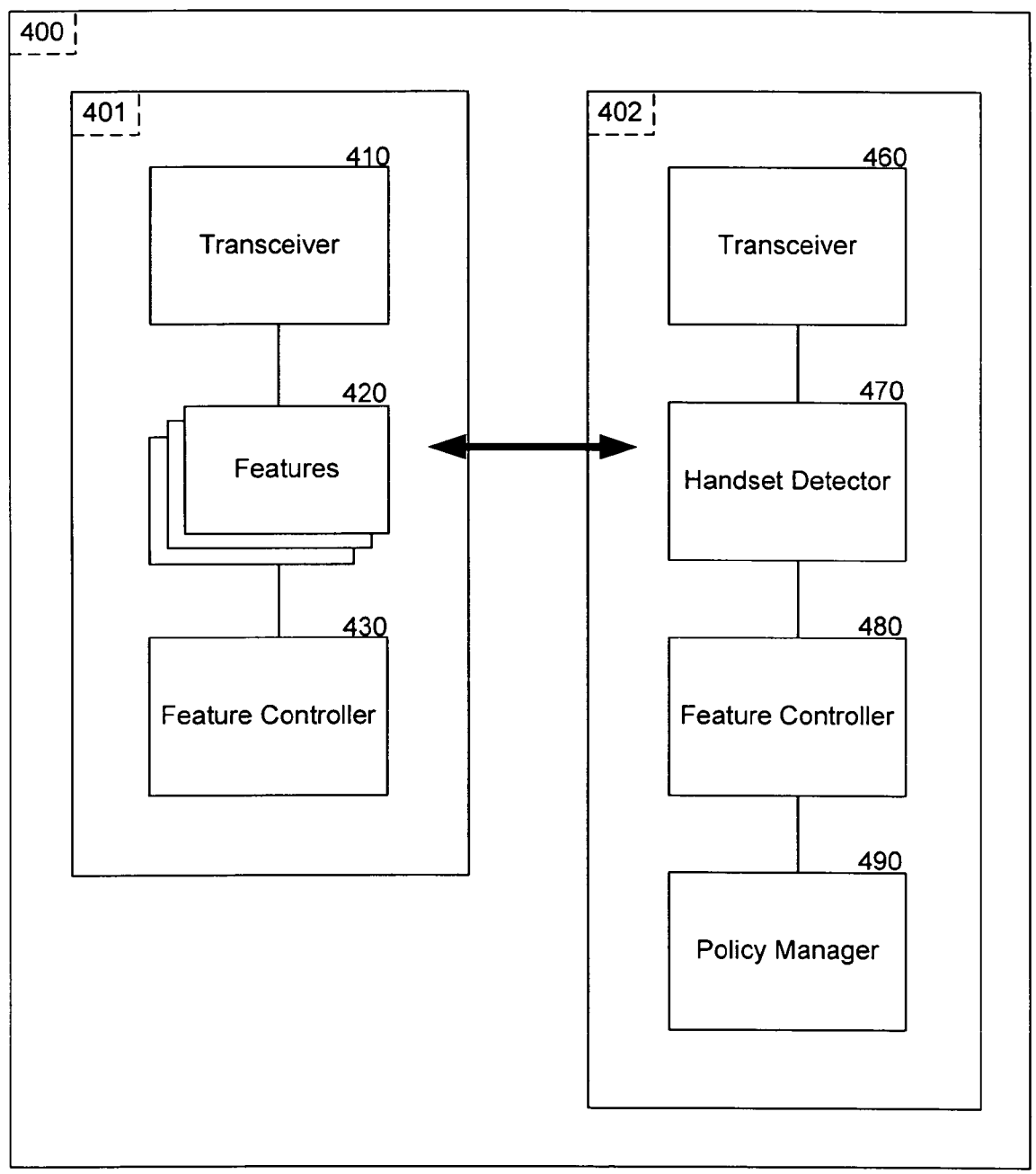
FIG. 4 is a block diagram illustrating an embodiment of a number of apparatus and system in accordance with the claimed subject matter.

FIG. 4 is a block diagram illustrating an embodiment of two apparatus 401 & 402 and system 400 in accordance with the claimed subject matter. In one embodiment, the system may include an enhanced mobile phone 401 and a cell transceiver 402. The enhanced mobile phone may be a hand-held mobile wireless telephone capable of being used in an area divided into small sections (cells). The cell transceiver 402 may be capable of allowing a mobile phone to communicate, utilizing a short-range wireless signal, via the telephone network.

In one embodiment, the enhanced mobile phone 401 may include a transceiver 410, a number of features 420, and a feature controller 430. In one embodiment, the cell transceiver 402 may include a transceiver 460, a handset detector 470, and a feature controller 480. In another embodiment, the cell transceiver may also include a policy manager 490. However, in an alternate embodiment, the policy manager may be part of a separate device.

In one embodiment, the transceivers 410 & 460 may be capable of sending and receiving wireless signals between the enhanced mobile phone 401 and the cell transceiver 402. In one embodiment, the transceiver may be capable of facilitating communication between the respective apparatus and a non-enhanced mobile phone, or another device. In one embodiment, the transceiver 410 may be capable of performing the actions illustrated by Blocks 110 & 120 of FIG. 1 and described above. In one embodiment, the transceiver 460 may be capable of performing the actions illustrated by Blocks 310 & 360 of FIG. 3 and described above.

In one embodiment, Features 420 may include one or more features related to functions of the mobile phone, as described above. In some embodiments, the features may include, but are not limited to, text messaging (e.g. Short Message Service, SMS), indicating that a message has arrived by playing a ring tone or vibrating, video conferencing, acting as a camera or video recorder, the ability to play music (e.g. MP3 files), or acting as a computer or personal digital assistant. However, these are merely a few non-limiting illustrative examples of features that may be found as part of the enhanced mobile phone 401.

In one embodiment, the Feature Controller 430 may be capable of altering the behaviour of the Features 420. In one embodiment, the Feature Controller may perform the actions illustrated by Blocks 140, 150, & 160 of FIG. 1 and described above. In another embodiment, the Feature Controller may also be capable of performing the actions illustrated by Blocks 280 & 290 of FIG. 2 and described above.

In one embodiment, the Handset Detector 470 may be capable of detecting a mobile phone that is within the operating range of the transceiver 460. In one embodiment, the Handset Detector may be capable of performing the actions illustrated by Blocks 320 and 340 for FIG. 3 and described above. In one embodiment, the Handset Detector may be capable of detecting when a mobile phone has either entered or exited the operating range of the transceiver. In another embodiment, the Handset Detector may be capable of detecting what power state, or the current operating state of a mobile phone.

In one embodiment, Feature Controller 480 may be capable of attempting to alter the behaviour of a feature of a mobile phone. In one embodiment, the Feature Controller may be capable of performing the action illustrated by Block 360 of FIG. 3 and described above. In another embodiment, the Feature Controller may also be capable of performing the action illustrated by Block 380 of FIG. 3 and described above. In one embodiment, the Feature Controller may be capable of initiating the control commands described above in relation to FIGS. 1 & 2.

In one embodiment, Policy Manager 490 may be capable of determining whether or not a mobile phone feature is authorized under a cell transceiver policy scheme. In one embodiment, the Policy Manager may also be capable of performing the actions illustrated by Blocks 350 & 370 of FIG. 3 and described above. In another embodiment, the Policy Manager may also be capable of performing the action illustrated by Block 380 of FIG. 3 and described above.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The following is claimed:

1. A method comprising:
    receiving a control command from a cell transceiver with a mobile phone having a plurality of features;
    determining if the control command requests the alteration of the behaviour of a requested one of the plurality of features under a predetermined policy corresponding to the mobile phone, wherein the policy is based on at least, user information as indicated by an identification device external to the mobile phone, wherein determining if the control command requests the alteration of the behaviour of a feature includes determining if the control command requests the disabling of an ability to record image(s);
    if the mobile phone is authorized, altering operation of the requested feature, wherein altering the requested feature includes attempting to disable the ability to record image(s);
    if the mobile phone is not authorized to use the feature in the area, requesting, by the cell transceiver, that the feature of the mobile phone be altered until the mobile phone receives a predetermined trigger allowing the mobile phone to reset to normal operation;
    refusing to facilitate communication, with the cell transceiver, between the mobile phone and a telephone network if the mobile phone is not an enhanced mobile phone; and
    refusing to facilitate communication, with the cell transceiver, between the mobile phone and the telephone network if the mobile phone includes a feature that is not authorized and the feature cannot be altered to comply with the policy.

2. The method of claim 1, further comprising, if the control command does not request the alteration, responding to the control command.

3. The method of claim 1, wherein the feature includes at least one feature selected from the group of abilities comprising:
    text messaging;
    Short Message Service (SMS);
    email;
    playing a ring tone;
    vibrating:
    video conferencing;
    recording image(s);
    recording audio;
    playing audio;
    acting as a computer; and
    acting as a personal digital assistant.

4. The method of claim 1, where attempting to alter the requested feature includes an action selected from the group of actions comprising:
    activating the feature;
    deactivating the feature; and
    modifying the behaviour of the feature.

5. The method of claim 4, further comprising:
    receiving a trigger; and
    attempting to unalter the feature.

6. The method of claim 5, wherein receiving a trigger includes transitioning to a new cell transceiver.

7. The method of claim 4, wherein attempting to alter the requested feature further includes transmitting a message that indicates the results of the attempted alteration.

8. The method of claim 7, further comprising:
    receiving a control command that requests an enumeration of supported features; and transmitting a message that includes an enumeration of supported features.

9. The method of claim 4, wherein attempting to alter the requested feature includes:
   detecting if a user approves of the requested alteration of the feature; and
   if approved, altering the requested feature.

10. An article comprising:
   a machine accessible medium having a plurality of machine accessible instructions, for attempting to optimize code layout, wherein when the instructions are executed, the instructions provide for:
   receiving a control command from a cell transceiver with a mobile phone having a plurality of features;
   determining if the control command requests the alteration of the behaviour of a requested one of the plurality of features under a predetermined policy corresponding to the mobile phone, wherein the policy is based on at least, user information as indicated by an identification device external to the mobile phone, wherein determining if the control command requests the alteration of the behaviour of a feature includes determining if the control command requests the disabling of an ability to record image(s);
   if the mobile phone is authorized, altering operation of the requested feature, wherein altering the requested feature includes attempting to disable the ability to record image(s);
   if the mobile phone is not authorized to use the feature in the area, requesting, by the cell transceiver, that the feature of the mobile phone be altered until the mobile phone receives a predetermined trigger allowing the mobile phone to reset to normal operation;
   refusing to facilitate communication, with the cell transceiver, between the mobile phone and a telephone network if the mobile phone is not an enhanced mobile phone; and
   refusing to facilitate communication, with the cell transceiver, between the mobile phone and the telephone network if the mobile phone includes a feature that is not authorized and the feature cannot be altered to comply with the policy.

11. The article of claim 10, further comprising instructions providing for, if the control command does not request the alteration, responding to the control command.

12. The article of claim 10, wherein the feature includes at least one feature selected from the group of abilities comprising:
   text messaging;
   Short Message Service (SMS);
   email;
   playing a ring tone;
   vibrating:
   video conferencing;
   recording image(s);
   recording audio;
   playing audio;
   acting as a computer; and
   acting as a personal digital assistant.

13. The article of claim 10, where the instructions providing for attempting to alter the requested feature includes instructions providing for an action selected from the group of actions comprising:
   activating the feature;
   deactivating the feature; and
   modifying the behaviour of the feature.

14. The article of claim 13, further comprising instructions providing for:
   receiving a trigger; and
   attempting to unalter the feature.

15. The article of claim 14, wherein the instructions providing for receiving a trigger includes instructions providing for transitioning to a new cell transceiver.

16. The article of claim 13, wherein the instructions providing for attempting to alter the requested feature further includes instructions providing for transmitting a message that indicates the results of the attempted alteration.

17. The article of claim 16, further comprising instructions providing for:
   receiving a control command that requests an enumeration of supported features; and
   transmitting a message that includes an enumeration of supported features.

18. The article of claim 13, wherein the instructions providing for attempting to alter the requested feature includes instructions providing for:
   detecting if a user approves of the requested alteration of the feature; and
   if approved, altering the requested feature.

19. An apparatus comprising:
   a cell transceiver capable of sending and receiving wireless cellular communication signals between a mobile phone having at least one feature and the cell transceiver, wherein the at least one feature includes an ability to record image(s) and the transceiver is capable of receiving from a cell transceiver a control command including a request to disable the ability to record image(s), the call transceiver to determine if the control command requests the alteration of the behaviour of a requested one of the plurality of features under a predetermined policy corresponding to the mobile phone, wherein the policy is based on at least, user information as indicated by an identification device external to the mobile phone the cell transceiver to refuse to facilitate communication, with the cell transceiver, between the mobile phone and a telephone network if the mobile phone is not an enhanced mobile phone and to refusing to facilitate communication, with the cell transceiver, between the mobile phone and the telephone network if the mobile phone includes a feature that is not authorized and the feature cannot be altered to comply with the policy; and
   a feature controller capable of altering the behaviour of the features in response to receiving a command from the cell transceiver, wherein the feature controller is capable of upon receiving the control command attempting to disable the ability to record image(s);
   wherein at least one of the wireless signals received from the cell transceiver includes a request for the feature controller to alter the behaviour of at least one feature.

20. The apparatus of claim 19, wherein
   the transceiver is further capable of receiving a control command; and the feature controller is further capable of:
   determining if the control command requests the alteration of the behaviour of a feature; and
   if so, attempting to alter the requested feature.

21. The apparatus of claim 20, the feature controller is further capable of:
   receiving a trigger; and
   attempting to unalter the feature.

22. The apparatus of claim 19, wherein the at least one feature includes at least one feature selected from the group of abilities comprising:

text messaging;
Short Message Service (SMS);
email;
playing a ring tone;
vibrating:
video conferencing;
recording image(s);
recording audio;
playing audio;
acting as a computer; and
acting as a personal digital assistant.

\* \* \* \* \*